Patented Jan. 20, 1948

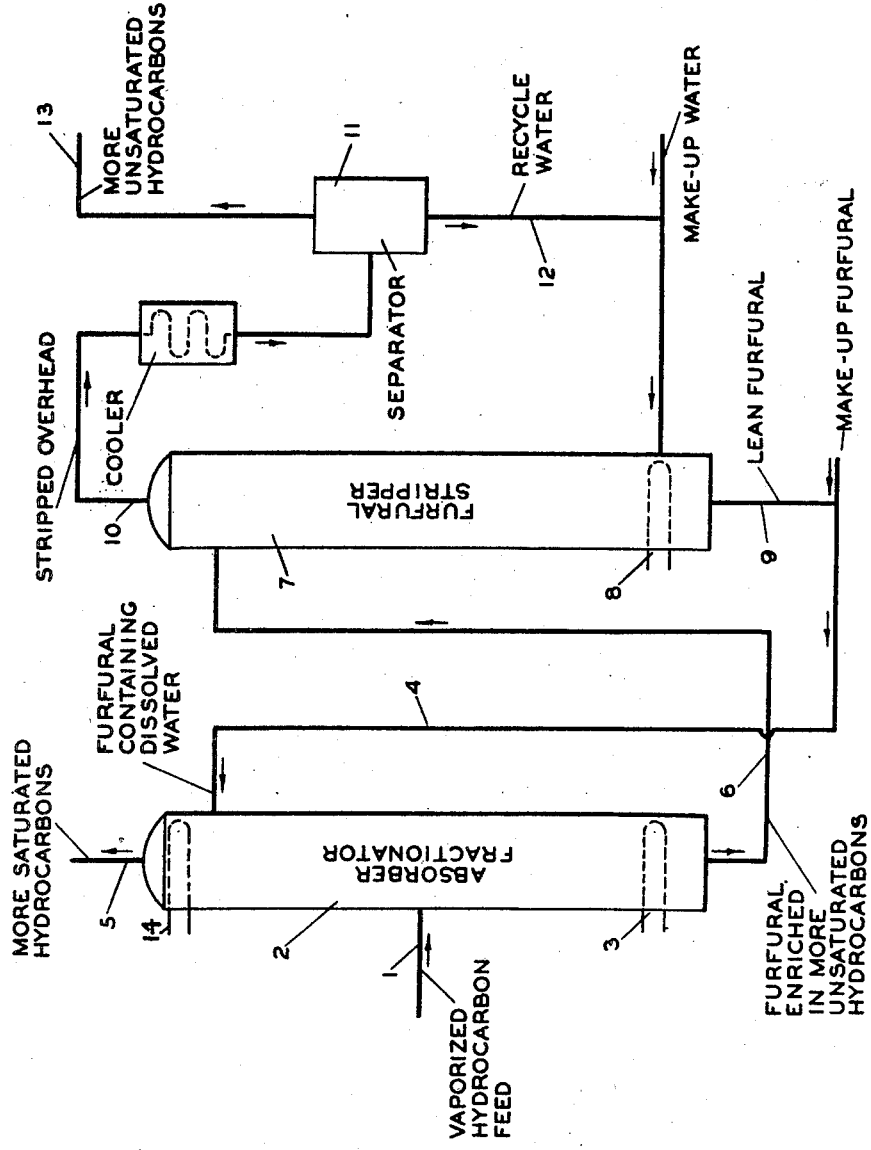

2,434,796

UNITED STATES PATENT OFFICE 2,434,796

PROCESS FOR THE EXTRACTIVE DISTILLATION OF C₄ HYDROCARBONS WITH FURFURAL

Karl H. Hachmuth, Bartlesville, Okla., assignor to Phillips Petroleum Company, a corporation of Delaware Application April 13, 1942, Serial No. 438,844

2 Claims. (Cl. 202—39.5)

This invention relates to processes using a selective solvent or absorbent, and to an improved solvent. More specifically it refers to an improved method for the utilization of furfural as an absorbent or selective solvent for hydrocarbon materials, especially low-boiling unsaturated aliphatic hydrocarbons.

Various hydrocarbon conversion processes, such as the high temperature, low pressure cracking of low-boiling paraffin hydrocarbons, heavy oils, etc., produce complex mixtures of hydrocarbons of various types such as paraffins, olefins, diolefins, etc. Such mixtures represent in many instances sources of valuable raw materials for a variety of uses when significant amounts of the materials can be separated economically in a suitably pure form. This is particularly true of aliphatic conjugated diolefins, such as butadiene, which have important uses in the preparation of high molecular weight polymers.

Efficient fractionation of such complex hydrocarbon mixtures ordinarily results in separation into portions consisting essentially of hydrocarbons of the same number of carbon atoms and exhibiting boiling ranges of say 10 to 30° F. Further precise fractionation of the primary cuts may effect appreciable segregation of the individual components, but ultimate separation by this method is expensive and often impractical because of the closeness of boiling points and sometimes the formation of constant boiling hydrocarbon mixtures or azeotropes.

Accordingly, methods other than simple fractionation must frequently be resorted to in order to accomplish the desired separation into substantially pure individual hydrocarbons. One of the well known methods is solvent extraction, whereby the more unsaturated hydrocarbons in either vapor or liquid phase are selectively extracted or absorbed from admixture with the more saturated hydrocarbons by a liquid solvent. Many such solvents have been suggested. U. S. Patent 1,882,978 lists a number of solvents which are said to be suitable for separating butadiene from admixture with other hydrocarbons, and furfural is included as a desirable solvent. I have found that furfural used according to the above-mentioned patent does have a considerable selectivity toward diolefinic hydrocarbons over monoolefins and paraffins. However, various operating difficulties have been encountered which greatly decrease the commercial attractiveness of the process.

In the selective absorption of volatile hydrocarbons by furfural, the hydrocarbon vapors are introduced into the middle of a fractionating column and are selectively extracted in a countercurrent fashion by liquid furfural passing down the column. In the bottom of the column heat is applied to provide the vapor necessary for the selective fractionation of the hydrocarbons in the presence of the solvent. The hydrocarbons are thus distilled countercurrent to the furfural. The temperature at which the bottom of the column must be maintained is the boiling point of the liquid in the bottom of the column at the operating pressure of the column, which latter in turn must be sufficiently high to permit condensation of a portion of the overhead vapors for reflux. The liquid in the bottom of the absorption column is composed of furfural having dissolved therein the selectively absorbed hydrocarbons. This liquid is removed and introduced into another column near the top. In this second column the dissolved hydrocarbons are stripped out of the furfural and removed from the top, while the hydrocarbon-denuded furfural leaves the bottom and is returned to the absorption column for further use. Again in this case, the temperature at which the bottom of the stripping column must be maintained is the boiling point of the liquid in the bottom of the column at the column operating pressure. Thus the furfural used in the system is continuously being subjected to vaporization at relatively high temperatures, the highest occurring in the kettle of the stripping column where the kettle product is furfural practically free from absorbed hydrocarbons. The temperature in the kettle of the absorption column is somewhat lower due to the presence of dissolved hydrocarbons in the furfural.

In the use of furfural as a selective solvent for unsaturated hydrocarbons, for example olefins or diolefins, and especially in the separation of butadiene from admixture with other C₄ hydrocarbons, or in similar diolefin separations, where relatively high-temperature steps are carried out, difficulty is experienced with the formation of polymer, gum, coke, and the like. The formation of polymer and other high-boiling materials may be due to polymerization or condensation of the furfural or of the diolefins and/or other unsaturates, or to other condensation or decomposition reactions occurring at the operating temperatures of the extraction and stripping columns. At any rate, these high-boiling impurities do form in substantial amounts, with a number of disadvantages resulting therefrom. The yield of desired hydrocarbon products is reduced, appreciable quantities of furfural are destroyed representing a continual expense of providing make-up solvent, and the efficiency of the furfural as a solvent is diminished due to the presence of dissolved and suspended heavy material. Furthermore, the column, transfer lines, heat exchangers, pumps, valves and other equipment become clogged with and corroded by insoluble gum, coke, and the like, reducing the capacity and efficiency of the equipment and requiring frequent shut-downs for clean out purposes.

In order to avoid complete stoppage of effective extraction, it is necessary to purify the furfural by distillation or other means whereby the furfural is freed of heavy polymers and the like. This may be done by either periodically distilling the entire amount of furfural being used in the system, or by continuously separating out a side stream and subjecting it to purification to maintain the polymer content sufficiently low so as not to interfere too much with the extraction.

Any means of diminishing the so-called polymer formation would greatly improve the extraction process by tending to eliminate the various operating difficulties mentioned above, so long as the selectivity of the process were not unduly decreased. Reduction of operating temperatures would be very desirable in that there would be less polymer, gum, and coke formation and therefore lowered furfural purification costs as well as less furfural loss due to the formation of these aforesaid waste materials, coupled with the decrease in or disappearance of the other disadvantages attendant on high-temperature operation of the absorption and stripping columns. Such a reduction of operating temperature could perhaps be accomplished by operating at lower pressures. However as is well known in the art, fractionating columns are usually operated much more economically if the pressure is maintained substantially above atmospheric, which allows for ready flow of materials through the column and other parts of the equipment, and permits a given column to handle a greater quantity of material. Reduction of operating pressures to atmospheric or below require the use of vacuum at some stages, with consequent cost and difficulty of producing the vacuum, danger of introducing air into the system, etc.

An object of this invention is to provide an effective and efficient process for the solvent extraction of four-carbon-atom hydrocarbon mixtures.

Another object of this invention is to improve the operation of a process using furfural as a selective solvent or absorbent for unsaturated hydrocarbons, such as butenes and/or butadiene.

Another object of this invention is to provide an improved solvent comprising furfural having incorporated therein a minor proportion of water.

Another object of this invention is to lower the temperature of operation of a hydrocarbon extraction system using furfural as the selective solvent without adversely affecting the extraction efficiency of the furfural.

Still another object of this invention is to reduce the loss of solvent, decrease the polymer, gum, and coke formation and resulting corrosion, and to increase the overall efficiency of a hydrocarbon extraction process in which furfural is the solvent.

Yet another object of this invention is to provide an improved process particularly applicable to the separation of butadiene from admixture with other hydrocarbons of similar boiling points not otherwise readily separated.

Still other objects and advantages will be apparent to those skilled in the art from a study of the following disclosure.

I have found that a furfural-water mixture may be effectively used as a selective solvent in place of furfural itself, as described herein. In the preparation of the selective solvent water may be incorporated with the furfural in minor amount at least sufficient to effect a substantial lowering of the boiling point, whereby greatly improved operation and overall efficiency are obtained. The boiling point of a furfural-water mixture is less than that of pure furfural and likewise it has been found that the boiling point of a furfural-hydrocarbon-water mixture is less than that of a furfural-hydrocarbon mixture, even when only a relatively small quantity of water is present. As little as about one per cent water by weight has been found to give a substantial lowering of the boiling point. In applying this principle of temperature reduction to a furfural absorption and stripping system, I have found that the presence of water in the absorption-stripping operations lowers the still temperatures to such an extent as to result in material reduction of the heat required to operate the stills, thus effecting substantial economies, and I have also found that due to the lower operating temperatures operation is facilitated by the formation of less polymer, gum, coke, and the like.

In the absorption of hydrocarbons such as butadiene in the absorption column and in the stripping of the rich furfural by fractionation in the stripping column, the temperature of operation is determined by the boiling points of the furfural and furfural-hydrocarbon mixtures at the given pressures. When water is used in the furfural solvent as disclosed herein, these temperatures are reduced appreciably and the temperature reductions reflect the aforementioned advantages of less furfural and/or other polymer, gum, and coke; and lower heat loads, less heat transfer equipment, and lower furfural losses may be realized.

In using water to improve the operation of a selective absorption system, it is important that the selectivity of the solvent not be impaired. The following data show clearly the quite unexpected fact that the selectivity of furfural for absorbing certain light hydrocarbons is not adversely affected by the addition of water, and in fact appears to be improved somewhat.

The accompanying table shows the selectivity of furfural and furfural-water for butadiene over butane and butane-1, where the selectivity is measured by the relative volatilities of these hydrocarbons (butane and butene-1) relative to butadiene in said furfural and furfural-water solvents. The relative volatility is defined as $$(Y_H X_B)/(X_H Y_B)$$

where $Y_H$ and $X_H$ are mol fractions of an individual hydrocarbon in vapor and liquid, respectively, and $Y_B$ and $X_B$ are the mol fractions of butadiene in vapor and liquid, respectively.

*Selectivity of furfural and furfural-water for butadiene over butane and butene-1; fifty pounds per square inch gage pressure*

| Solvent | Test No. | Relative Volatility | |
|---|---|---|---|
| | | n-Butane | Butene-1 |
| Furfural | 1 | 2.177 | 1.677 |
| Do | 2 | 2.260 | 1.750 |
| Do | 3 | 2.395 | 1.814 |
| Do | 4 | 2.224 | 1.683 |
| Do | 5 | 1.864 | 1.618 |
| Average | | 2.265 | 1.708 |
| Furfural Containing 8.9% Water by Weight | 6 | 2.611 | 1.847 |
| Do | 7 | 2.320 | |
| Average | | 2.465 | 1.847 |
| Furfural Containing 4.0% Water by Weight | 8 | 2.346 | 1.664 |
| Do | 9 | 2.293 | |
| Do | 10 | 2.318 | |
| Do | 11 | 2.370 | 1.694 |
| Do | 12 | 2.819 | 1.598 |
| Do | 13 | 2.432 | 1.696 |
| Do | 14 | 2.538 | 1.725 |
| Do | 15 | 1.732 | |
| Do | 16 | 2.063 | |
| Do | 17 | 1.893 | |
| Average | | 2.280 | 1.675 |

From the above selectivity values and more particularly the average values, it will be seen that the addition of water to furfural in the stated proportions has been unexpectedly found actually to increase slightly the relative volatilities of these hydrocarbons in furfural.

The extent to which incorporation of a minor proportion of water in furfural effects a lowering of the boiling point varies greatly with the amount of water used. The addition of water up to three or four per cent by weight exerts a very marked decrease in the boiling point of the furfural. Thus, at atmospheric pressure, the boiling point of pure furfural is 323° F., of furfural containing one weight per cent water is 296° F., two per cent water, 229° F., three per cent water, 220° F., four per cent water, 215° F. When an additional three or four per cent water is added, the boiling point depressing effect is very much less than for the first few per cent. Thus, the boiling point of furfural containing six per cent water is 211° F., and containing eight per cent water is 209.5° F. The boiling point in this way approaches a minimum of 208° F. and is thus little affected by addition of more water. However, more water can be added to a furfural-water solution without adversely affecting its selectivity toward the different hydrocarbons as shown above.

Accordingly, my preferred lower limit for the amount of water to be used with furfural as a selective solvent is that quantity which will produce a substantial lowering of the boiling point, as little as one per cent or even less having a considerable effect, as shown. Furthermore, there is ordinarily little advantage to be gained by using an amount of water greater than say from about four to eight per cent since quantities in this range produce furfural-water mixtures having boiling points substantially equal to the minimum boiling point. However, the increased percentages of water may slightly improve the selectivity as described above.

One factor to be considered is the fact that increasing the percentage water in a furfural-water solution decreases its solvent capacity for hydrocarbons somewhat, requiring a higher solvent circulation rate in the system for the purification of a given quantity of hydrocarbons. Solvent capacity is not to be confused with selectivity, which as heretofore mentioned is not adversely affected by addition of water.

Accordingly, the upper limit for the percentage water in furfural is somewhat a matter of choice. It is, however, preferably limited to that amount which can be used without causing the separation of two liquid phases in the coolest point of the absorption or stripping columns, as will now be explained.

The solubility of water in furfural varies greatly with temperature, varying from low values at low temperatures on up to a point, 251° F., above which furfural and water are miscible in all proportions. As explained before, the kettle temperature in a column is the boiling point of the kettle product at the column pressure. However, this temperature is a maximum for the column, and other parts of the column may be considerably cooler. For instance, in a column using furfural-water as a selective solvent for butadiene, operated at a pressure of sixty-five pounds per square inch absolute, the kettle temperature is 250° F., while the temperatures near the top in the absorption sections are about 110° F. Therefore, I prefer to operate this column with not more than about 6.5 weight per cent water in the furfural, which is the limit above which two liquid phases would appear at 110° F. Use of more water would not gain any more than a few degrees lowering of the kettle temperature at the most, and could cause phase separation in the upper parts of the column. Of course, if the minimum temperature of the column should be raised, a higher percentage water could be used. Correspondingly, lower minimum temperatures would require lower percentages of water in order to avoid phase separation in the column. Obviously, the higher the operating temperatures the higher must be the pressure for maintenance of proper operation, as is well known in the art.

Such phase separation is undesirable in that layers of water immiscible with the furfural-water solvent will build up on the trays of a plate column, and these layers periodically cause surging by their overflow. In a packed column, uneven wetting of packing material is likely to occur. In addition the excess immiscible water merely cuts down the capacity of the system by taking up space which might otherwise be used by the furfural-water solvent. Thus, it is usually desirable to have percentage of water not greater than that which is sufficient to saturate the furfural at the coolest temperature encountered in the extraction system, that is, in the extraction or stripping columns. Since temperatures obtainable by the use of ordinary cooling water in commercial installations generally are not much lower than 110° F., it will be seen that I may easily use a furfural-water mixture having practically the minimum boiling point if desired. Four per cent water is generally found to be about the optimum value. The use of water in such amounts that a phase separation occurs in the column is undesirable as pointed out, since the effective solvent in the furfural containing dissolved water, and a separate water phase will have no substantial solvent activity.

When stripping dissolved hydrocarbons from the furfural-water solvent, a certain amount of the water may distill overhead along with the hydrocarbons, thus reducing the water content of the furfural. A smaller quantity of water may also go overhead along with undissolved hydrocarbons from the absorption column. If this water were not replaced, the water content of the system would continue to drop. Accordingly, water which distills overhead with the hydrocarbons is continuously replaced. I have found that the most satisfactory way of accomplishing this is to cool the hydrocarbons sufficiently to cause separation of a water layer, and then to recycle this water to the system, preferably to the bottom of the stripping column. A number of advantages are realized by this procedure; for example, the hydrocarbons being removed from the system are thus freed of any water, the water separated out contains small amounts of hydrocarbons which are not lost but are returned to the system, the water need not be purified in any way, and control of the process is simplified in that necessity for measuring make-up water to replace the water carried out with the hydrocarbons is eliminated. It is especially advantageous to recycle the water to the bottom of the stripper, as it maintains the proper water concentration at that point and thus avoids higher kettle temperature which would result if the water were not returned to the kettle.

By realizing the much lowered boiling point through use of water in furfural, the hydrocarbon absorption and stripping operating temperatures are likewise lowered, giving overall lowered operating temperatures. And, these overall lowered temperatures are reflected, as disclosed above, in less furfural and hydrocarbon polymer, gum, and coke formation with less attendant corrosion and clogging to processing equipment. Furthermore, the efficiency of the solvent is maintained by the lessened quantity of heavy material produced in a given time, and purification of the furfural may be done at less frequent intervals.

I have thus determined that furfural containing water not only has the advantages of lowered boiling point, but quite unexpectedly is also an excellent selective solvent for the type of hydrocarbon separations described. By the use of my invention I readily separate out a butadiene concentrate of better than 99 per cent purity from a mixture of butadiene, butenes, and n-butane. I also find the furfural-water mixture highly advantageous in extracting butenes from admixture with butane.

In the accompanying drawing which portrays diagrammatically equipment which may be used in carrying out the present invention, the vaporized feed containing more saturated and more unsaturated hydrocarbons is fed via line 1 into fractionating column 2 equipped with reboiler 3. The furfural solvent is fed into the top of the column via line 4. Undissolved overhead consisting of the more saturated components of the feed is removed via line 5. Furfural rich in the more unsaturated components of the feed leaves via line 6 passing to stripper 7 equipped with reboiler 8. Lean furfural leaves stripper 7 via line 9 and is recycled via line 4. The stripped vapors leave via line 10 and after cooling to condense vaporized water and separation of water as in 11 leave via line 13. The separated water phase is recycled to the bottom of stripper 7 via line 12. Column 2 may be provided with a refluxing condenser 14 if desired.

The advantageous features of this invention have been described with especial reference to solvent extraction of low-boiling unsaturated hydrocarbons carried out with the hydrocarbons largely in the vapor phase. The same type of problem occurs to a greater or lesser extent with many other hydrocarbon purification processes using liquid furfural as a selective solvent or absorbent if the furfural is subjected to any appreciable vaporization, particularly, though not exclusively, when unsaturated hydrocarbons are involved, and the invention may be applied to such processes with suitable modifications by those skilled in the art, in view of the foregoing disclosure.

I claim:

1. In a process for the treatment of a mixture of low-boiling aliphatic $C_4$ hydrocarbons of varying degrees of saturation to separate the more unsaturated portion from the more saturated portion thereof which comprises introducing a stream of said $C_4$ hydrocarbons into a fractionating column at an intermediate point therein and fractionally distilling said stream therein at a pressure substantially above atmospheric, introducing into said column a stream of furfural and passing same downwardly therein to effect selective dissolution in said furfural of the more unsaturated portion of said mixture, removing overhead an undissolved product comprising the more saturated portion of said mixture, condensing a portion of the overhead vapors and refluxing said column with the condensate, introducing heat into the bottom of said column and thereby boiling the bottom product to provide the vapor necessary for the distillation of the hydrocarbons in the presence of the furfural, removing a bottom product comprising the more unsaturated hydrocarbons dissolved in said furfural, introducing said bottom product into a stripper column and therein stripping said more unsaturated hydrocarbons at a pressure substantially above atmospheric, introducing heat into the bottom of said stripper column and thereby boiling the bottom product, removing from said stripper column a bottom product of lean furfural and returning same to said fractionating column, and removing from said stripper column the stripped overhead product comprising said more unsaturated hydrocarbons, the improvement which comprises reducing substantially the operating temperature in said process by providing in said furfural water in amount ranging from about one weight per cent up to but not exceeding that at which the furfural is saturated with water at the coolest temperature encountered in said fractionating column and said stripping column, cooling said stripped overhead product sufficiently to cause separation of a water layer containing dissolved hydrocarbons, withdrawing said water layer and introducing same directly into the bottom of said stripper column.

2. In a process for the treatment of a mixture consisting essentially of butadiene and more saturated aliphatic $C_4$ hydrocarbons to separate the more unsaturated portion from the more saturated portion thereof which comprises introducing a stream of said $C_4$ hydrocarbons into a fractionating column at an intermediate point therein and fractionally distilling said stream therein at a pressure of approximately 65 pounds per square inch absolute, with a kettle temperature of approximately 250° F. and a top temperature of about 110° F., introducing into said column a stream of furfural and passing same downwardly therein to effect selective dissolution in said furfural of the more unsaturated portion of said mixture, removing overhead an undissolved product comprising the more saturated portion of said mixture, condensing a portion of the overhead vapors and refluxing said column with the condensate, introducing heat into the bottom of said column and thereby boiling the bottom product to provide the vapor necessary for the distillation of the hydrocarbons in the presence of the furfural, removing a bottom product comprising the more unsaturated hydrocarbons dissolved in said furfural, introducing said bottom product into a stripper column and therein stripping said more unsaturated hydrocarbons at a pressure substantially above atmospheric, introducing heat into the bottom of said stripper column and thereby boiling the bottom product, removing from said stripper column a bottom product of lean furfural and returning same to said fractionating column, and removing from said stripper column the stripped overhead product comprising said more unsaturated hydrocarbons, the improvement which comprises reducing substantially the operating temperature in said process by providing in said furfural water in amount ranging from about one weight per cent up to but not exceeding that at which the furfural is saturated with water at the coolest temperature encountered in said fractionating column and said stripping column, cooling said stripped overhead product sufficiently to cause separation of a water layer containing dissolved hydrocarbons, withdrawing said water layer and introducing same directly into the bottom of said stripper column.

KARL H. HACHMUTH.

REFERENCES CITED

The following references are of record in the file of this patent:

UNITED STATES PATENTS

| Number | Name | Date |
| --- | --- | --- |
| 2,087,455 | Stratford | July 20, 1937 |
| 1,948,777 | Young et al. | Feb. 13, 1934 |
| 1,875,311 | Voorhees et al. | Aug. 30, 1932 |
| 1,882,978 | Schmidt et al. | Oct. 18, 1932 |
| 1,817,667 | Blau | Aug. 4, 1931 |
| 2,205,996 | Van Wijk | June 25, 1940 |
| 2,264,878 | Hatch | Dec. 2, 1941 |
| 2,162,963 | McKittrick | June 20, 1939 |
| 2,366,360 | Semon | Jan. 2, 1945 |

FOREIGN PATENTS

| Number | Country | Date |
| --- | --- | --- |
| 495,304 | Great Britain | Nov. 10, 1938 |

OTHER REFERENCES

Moor et al., Extraction of 1,3-Butadiene from Cracked Gases, Transactions of the Research Plant "Khimgas," Materials on Cracking and Chemical Treatment of Cracked Products, vol. 2, 260 pages, O. N. T. I., Leningrad, 1935, pages 157–164. Confidential translation by Universal Oil Products Co. in Div. 32. Tables 1 and 2 and page 4 only. (Copies of these pages may be obtained.)